(12) United States Patent
Goodman et al.

(10) Patent No.: US 7,376,961 B2
(45) Date of Patent: May 20, 2008

(54) CONTACTLESS POWER AND/OR DATA TRANSMISSION IN AN AUTOMATED DATA STORAGE LIBRARY EMPLOYING SEGMENTED COILS

(75) Inventors: Brian Gerard Goodman, Tucson, AZ (US); Diana Joyce Hellman, Tucson, AZ (US); Michael Philip McIntosh, Tucson, AZ (US); Daniel Scott Moore, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 10/856,328

(22) Filed: May 28, 2004

(65) Prior Publication Data

US 2005/0268313 A1 Dec. 1, 2005

(51) Int. Cl.
*G11B 17/03* (2006.01)

(52) U.S. Cl. .................. 720/632; 720/600; 720/601; 360/98.04; 360/98.05; 360/98.06; 369/30.38; 369/30.43; 369/30.45; 369/30.51; 369/30.55; 369/30.57; 414/266; 414/277; 414/281

(58) Field of Classification Search ............... 720/600, 720/601, 614, 619, 654; 360/92, 98.04, 98.05, 360/98.06; 369/30.38, 30.43, 30.45, 30.51, 369/30.55, 30.57; 414/277, 268, 281
See application file for complete search history.

(56) References Cited

U.S. PATENT DOCUMENTS

| | | | | |
|---|---|---|---|---|
| 3,781,687 A | * | 12/1973 | Nakahara et al. ............ 455/523 |
| 3,815,511 A | * | 6/1974 | Dukowicz et al. .......... 104/282 |
| 3,913,493 A | * | 10/1975 | Maki et al. ................. 104/281 |
| 4,820,101 A | * | 4/1989 | Fenn .......................... 414/21 |
| 4,841,869 A | * | 6/1989 | Takeuchi et al. ............ 104/292 |
| 4,924,171 A | * | 5/1990 | Baba et al. ................. 323/347 |
| 5,033,391 A | * | 7/1991 | Watanabe ................... 104/23.2 |
| 5,293,308 A | * | 3/1994 | Boys et al. .................... 363/37 |
| 5,362,192 A | * | 11/1994 | Dang .......................... 414/280 |
| 5,395,199 A | * | 3/1995 | Day, III et al. ............. 414/267 |
| 5,517,924 A | * | 5/1996 | He et al. ..................... 104/286 |
| 5,551,350 A | * | 9/1996 | Yamada et al. ............. 104/293 |
| 5,613,154 A | * | 3/1997 | Burke et al. .................... 710/1 |
| 5,737,211 A | * | 4/1998 | Hirai et al. ................. 363/144 |
| 5,781,367 A | * | 7/1998 | Searle et al. .................. 360/92 |
| 6,089,512 A | | 7/2000 | Ansorge et al. ............. 246/194 |

(Continued)

FOREIGN PATENT DOCUMENTS

WO  WO 2004062959 A1 * 7/2004

*Primary Examiner*—Andrea Wellington
*Assistant Examiner*—Carlos E Garcia
(74) *Attorney, Agent, or Firm*—John H. Holcombe (57) ABSTRACT

A contactless power system for an automated data storage library having a plurality of storage shelves for storing data storage cartridges, at least one picker for accessing the data storage cartridges with respect to the storage shelves, and a transport system for guiding the picker(s) along at least one path with respect to the storage shelves. The contactless power system comprises a plurality of segmented coils arranged in parallel to the path(s), and in proximity to at least one induction receiver of the picker(s); and at least one power source supplying power to the segmented coils, for inductive transmission of power by the segmented coils to the induction receiver(s) of the picker(s). The power source (s) may switch the supplied power to selected segmented coils based on an indication of the position of the induction receiver(s) of the picker along the path.

2 Claims, 5 Drawing Sheets

U.S. PATENT DOCUMENTS

| | | | |
|---|---|---|---|
| 6,095,054 A * | 8/2000 | Kawano et al. | 104/139 |
| 6,213,705 B1 * | 4/2001 | Wilson | 414/274 |
| 6,222,699 B1 | 4/2001 | Luffel et al. | 360/92 |
| 6,262,863 B1 * | 7/2001 | Ostwald et al. | 360/92 |
| 6,327,519 B1 | 12/2001 | Ostwald et al. | 700/245 |
| 6,351,685 B1 * | 2/2002 | Dimitri et al. | 700/214 |
| 6,357,359 B1 * | 3/2002 | Davey et al. | 104/282 |
| 6,397,990 B1 * | 6/2002 | Brien et al. | 191/10 |
| 6,425,468 B1 | 7/2002 | Yamamoto et al. | 191/10 |
| 6,499,701 B1 * | 12/2002 | Thornton et al. | 246/194 |
| 6,510,020 B1 | 1/2003 | Holmquist et al. | 360/92 |
| 6,547,050 B1 | 4/2003 | Schroder et al. | 191/22.2 |
| 6,570,734 B2 | 5/2003 | Ostwald et al. | 360/92 |
| 6,669,430 B2 * | 12/2003 | Ostwald et al. | 414/277 |
| 6,751,048 B2 * | 6/2004 | Ostwald et al. | 360/92 |
| 6,931,304 B1 * | 8/2005 | Miller et al. | 700/245 |
| 2002/0018195 A1 * | 2/2002 | Iwamoto et al. | 355/72 |
| 2002/0027742 A1 | 3/2002 | Ostwald et al. | 360/92 |
| 2003/0002201 A1 | 1/2003 | Gupta et al. | 360/92 |
| 2003/0002202 A1 | 1/2003 | Smith et al. | 360/92 |
| 2003/0002203 A1 | 1/2003 | Gustafson et al. | 360/92 |
| 2003/0002204 A1 | 1/2003 | Ostwald et al. | 360/92 |
| 2003/0125834 A1 * | 7/2003 | Campbell et al. | 700/214 |
| 2004/0168604 A1 * | 9/2004 | Zorn et al. | 104/118 |

* cited by examiner

CONTACTLESS POWER AND/OR DATA TRANSMISSION IN AN AUTOMATED DATA STORAGE LIBRARY EMPLOYING SEGMENTED COILS

FIELD OF THE INVENTION

This invention relates to automated data storage libraries which store data storage cartridges on storage shelves and provide a robot accessor or picker for accessing the data storage cartridges with respect to the storage shelves, and, more particularly, to providing power and/or data transmission with respect to the picker.

BACKGROUND OF THE INVENTION

A typical automated data storage library comprises storage shelves for storing data storage cartridges, data storage drives for reading and/or writing with respect to the data storage cartridges, and one or more pickers for accessing the data storage cartridges with respect to the storage shelves and data storage drives. The picker is typically moved in a predetermined path along a set of tracks or at the end of a swing arm. If a swing arm, the library is in the form of a cylinder and the maximum size of the library is typically fixed, and additional libraries or pass-through ports must be added if additional capacity is required. If a set of tracks are employed to guide the picker, the picker typically comprises a carriage that rides on the tracks. Additional capacity may be added by extending the tracks, for example, by adding a frame having tracks and storage shelves.

The carriage typically trails a cable which is coupled at the trailing end to the library, over which power and communications are provided to the picker. Thus, when the library is extended, in addition to extending the tracks, the trailing cable is replaced with a longer cable, to allow the picker carriage to go the additional distance along the tracks, incurring additional cost and waste. Further, the path of the tracks and the carriage must be straight or nearly so, so that the trailing cable will stay in the path. Still further, it is difficult to have multiple paths, to insure that the trailing cable will not cross a track. These limitations result in the requirement that an expandable library is a long rectangle.

Other methods than a trailing cable have been suggested. One example comprises U.S. Pat. No. 6,089,512, which proposes an inductive power transmitter and a parallel data communication antenna for a track guided transport system. In one embodiment, the power and data transmission are the same system. The system is designed for movement of assembly parts for an automotive plant or of pallets for high shelf storage facilities, both of which are fixed in size. The inductive power transmitter is a continuous, seamless, linear "primary circuit".

Such a system is not easily adaptable to an automated data storage library that may be expanded, since the power transmitter would have to be redesigned and rebuilt to accommodate the additional size of the library, for example, due to the different attenuation characteristics of the different length. Additionally, the continuous, seamless "primary circuit" would prevent the possibility of multiple paths.

SUMMARY OF THE INVENTION

The present invention comprises a contactless power system for an automated data storage library, and an automated data storage library having the contactless power system. The automated data storage library comprises a plurality of storage shelves for storing data storage cartridges, at least one picker for accessing the data storage cartridges with respect to the storage shelves, and a transport system for guiding the picker(s) along at least one path with respect to the storage shelves.

The contactless power system, in one embodiment, comprises a plurality of segmented coils arranged in parallel to the path(s), and in proximity to at least one induction receiver of the picker(s); and at least one power source supplying power to the segmented coils, for inductive transmission of power by the segmented coils to the induction receiver(s) of the picker(s).

In a further embodiment, the power source(s) additionally switches the supplied power to selected segmented coils based on an indication of the position of the induction receiver(s) of the picker along the path.

In another embodiment, the power source(s) switches the supplied power to a selected one of the segmented coils close to the position of the induction receiver of the picker along the path(s), and to at least one of the segmented coils adjacent to the selected close segmented coil.

In a still further embodiment, adjacent segmented coils are separated by gaps less than the width of the induction receiver of the picker, and the selected adjacent segmented coil is at the same side of the selected close segmented coil, along the path, as the induction receiver of the picker.

In still another embodiment, the contactless power system additionally comprises a contactless communication system for communicating with a communication system of the picker(s).

In a further embodiment, the contactless communication system comprises an antenna system employing the segmented coils. Still further, the power source supplies the supplied power at a power frequency, and the contactless communication system operates in a data transmission frequency range different from the power frequency.

In another embodiment, the contactless communication system comprises an antenna system separate from the segmented coils.

In still another embodiment, the plurality of segmented coils are substantially arranged in a common plane parallel to the at least one path. In a further embodiment, each of the plurality of segmented coils is arranged around a central axis, and the central axis is substantially perpendicular to the common plane.

In another embodiment, the transport system comprises a set of tracks along the path(s); and the picker(s) comprises a carriage for riding on the set of tracks, and comprises a tachometer for determining the linear position of the carriage in the direction of the path, the position of the carriage providing the indication of the position of the induction receiver of the picker along the path.

In still another embodiment, at least one load proximity sensor detects the inductive load characteristics of the plurality of segmented coils to detect the proximity of the induction receiver of the picker with respect to the segmented coils, and provides the indication of the position of the induction receiver of the picker along the path.

In another embodiment, position sensors are provided along the path for providing the indication of the position of the induction receiver of the picker along the path.

In a further embodiment, the transport system set of tracks and the picker carriage are arranged such that the induction receiver(s) is moved parallel to the common plane in close proximity to the plurality of segmented coils.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

FIGS. 1, 2, 3, 4, 5 and 6 illustrate embodiments of an automated data storage library 10 in accordance with the present invention. The automated data storage library is arranged for accessing data storage cartridges, typically in response to commands from at least one external host system, and comprises a plurality of storage shelves 16 for storing data storage cartridges; at least one data storage drive 15 for reading and/or writing data with respect to the data storage cartridges; and at least one picker 18 for transporting the data storage cartridges between the plurality of storage shelves 16 and the data storage drive(s). The library may also comprise one or more operator panels 23 or other user interface, such as a web-based interface, which allows a user to interact with the library. The library 10 may comprise one or more frames. The picker 18 comprises a gripper assembly 20 for gripping one or more data storage cartridges, and may comprise an accessor sensor 22, such as an LED (Light Emitting Diode) emitter/detector, a bar code scanner, and/or reading system, such as a smart card reader or similar system etc., mounted on the gripper 20, to "read" identifying information about the data storage cartridges. An example of a data storage library which may implement the present invention is the IBM 3584 UltraScalable Tape Library.

Figure 1:
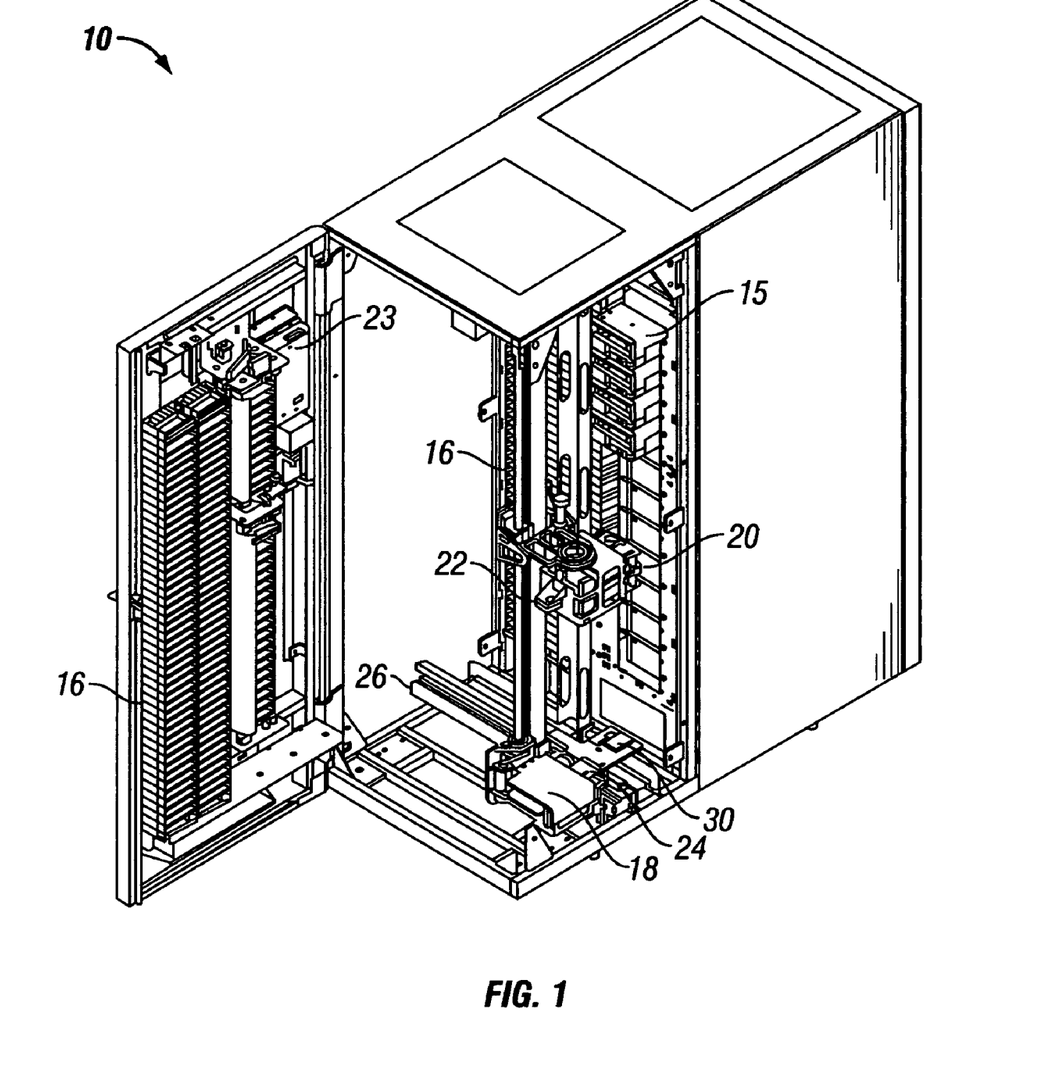
FIG. 1 is an isometric illustration of an automated data storage library employing an embodiment of a contactless power system in accordance with the present invention.
Figure 2:
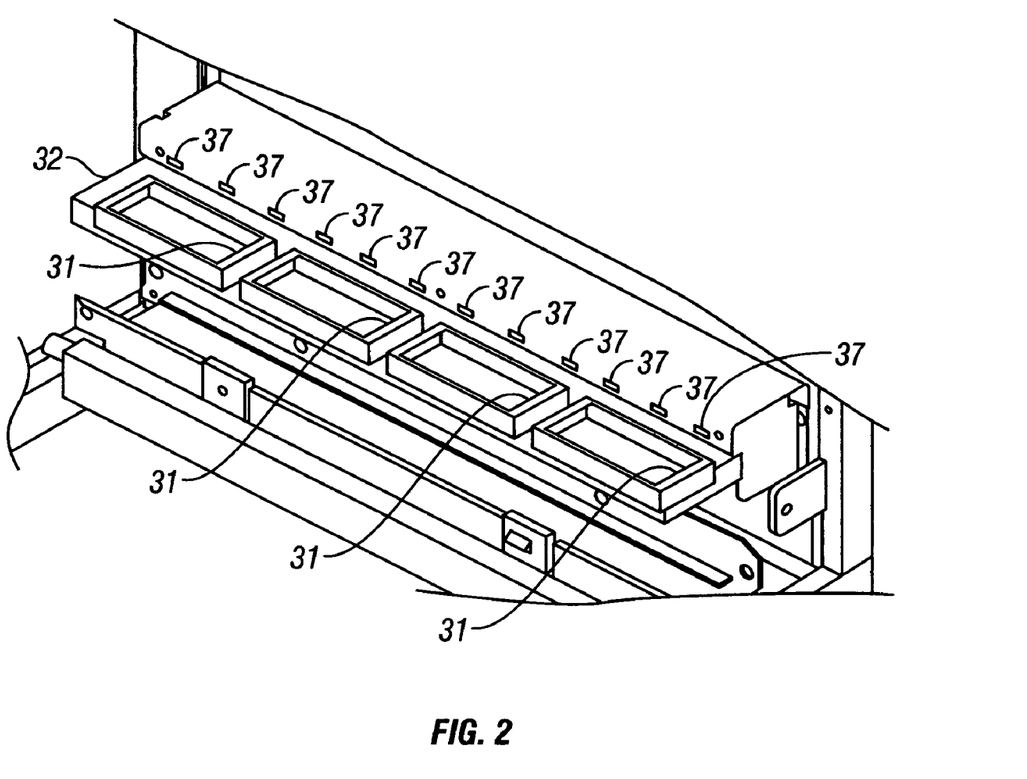
FIG. 2 is a partial view of the automated data storage library of FIG. 1 illustrating an embodiment of segmented coils in accordance with the present invention.
Figure 3:
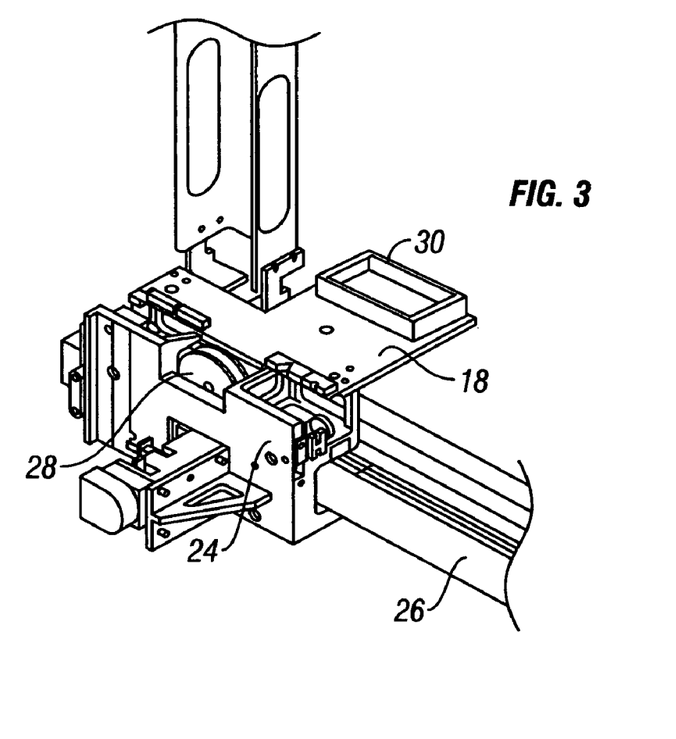
FIG. 3 is a partial view of a carriage of the picker of FIG. 1, illustrating an embodiment of an induction receiver in accordance with the present invention.
Figure 4:
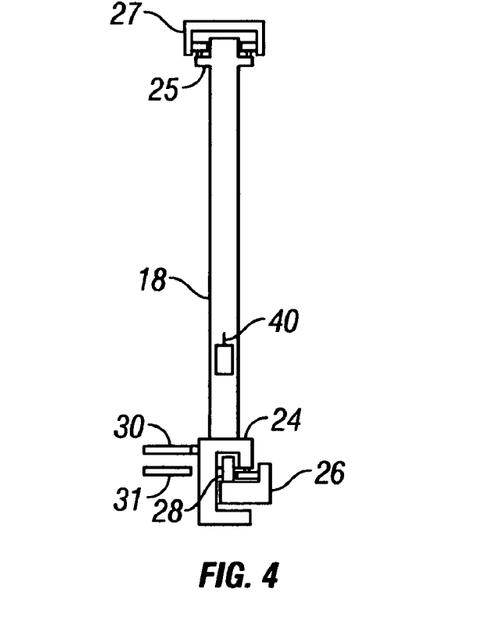
FIG. 4 is a schematic illustration of the picker of FIG. 1 and tracks and a segmented coil of the automated data storage library of FIG. 1.

The data storage drives 15, for example, may be optical disk drives or magnetic tape drives, and the data storage cartridges may comprise optical or magnetic tape media, respectively, or any other removable media and associated drives. As examples, a data storage drive may comprise an IBM LTO Ultrium Drive, may comprise a DLT 8000 Drive, etc. Additionally, a control port may be provided, which acts to communicate between a host and the library, e.g., receiving commands from a host and forwarding the commands to the library, but which is not a data storage drive.

In addition to having several frames, the library may also comprise a second picker, similar to the picker 18. In one example, in the event of a failure or other unavailability of the picker 18, or its gripper 20, etc., the second picker takes over. Alternatively, both pickers may operate at the same time, but with their motions controlled to avoid overlap.

In the example, the picker 18 moves its gripper in at least two directions, called the horizontal "X" direction and vertical "Y" direction, to retrieve and grip, or to deliver and release the data storage cartridges at the storage shelves 16 and to load and unload the data storage cartridges at the data storage drives 15. A carriage, in the example comprising a lower portion 24 and an upper portion 25, provides the horizontal motion, and the gripper 20 is moved vertically on the carriage to provide the vertical motion. The upper portion 25 of the carriage of picker 18 guides the carriage in a track 27, the lower portion 24 of the carriage is guided on a lower track 26 of the library, and a drive wheel 28 is operated to propel the carriage along the tracks. The tracks thus define a path for the picker 18. Many alternative arrangements are known to those of skill in the art, such as dual lower tracks, or a monorail guideway.

A contactless power system is provided for the automated data storage library 10. The contactless power system, in one embodiment, comprises a plurality of segmented coils 31 arranged in parallel to the path defined by the tracks 26, 27, and in proximity to at least one induction receiver 30 of the picker 18. Power is supplied to the segmented coils 31, for inductive transmission of power by the segmented coils 31 to the induction receiver 30 of the picker 18. The induction receiver 30 may comprise a coil similar to the segmented coils 31. In one embodiment, segmented coils 31, and/or induction receiver 30 may additionally comprise a coil with a ferrite center.

The segmented coils 31 allow a library to be extended by adding additional segmented coils. Further, the path of the tracks and the carriage may be varied from straight, and multiple paths are possible by arranging the segmented coils appropriately. For example, the attenuation characteristics of each of the segmented coils may be similar, such that there are no theoretical limits to the number of segmented coils.

As one example, the supplied power is provided to all of the segmented coils such that they are all energized when the library is in normal operation. As another example, the supplied power is switched to selected segmented coils 31 based on an indication of the position of the induction receiver 30 of the picker along the path. Herein, the position of the induction receiver may be determined directly, or indirectly based on the position of the picker. In one embodiment, the power is supplied to a selected one of the segmented coils close to the position of the induction receiver of the picker along the path, and to at least one of the segmented coils adjacent to the selected close segmented coil.

In one embodiment, the servo system position of the picker is employed to measure the position of the induction receiver. The picker servo system comprises a tachometer, for example, associated with a motor, that measures the horizontal motion of the picker, for example, by measuring the rotation of the motor or the drive wheel 28 to determine the positioning of the picker so that the gripper is positioned at the desired column of storage shelves or the desired data storage drive. Thus, the tachometer also provides an indication of the position of the picker along the path defined by the tracks, and from that position, the position of the induction receiver of the picker can be determined.

In another embodiment, position sensors 37 are provided along 32 the path(s) for sensing and determining the position of the induction receiver of the picker. As examples, the position sensors 37 may be magnetic sensors, infrared sensors, proximity sensors, optical sensors, etc.

In an alternative embodiment, the inductive load characteristics of a coil changes in accordance with the distance from the inductive receiver, as is known to those of skill in the art. Therefore, this change can be monitored by one or more load proximity sensors associated with the segmented coils to provide an indication of the position of the induction receiver of the picker.

In addition to contactless power, a contactless communication system is provided, in one embodiment, for communicating with a communication system of the picker 18. In one embodiment, the contactless communication system comprises an antenna system employing the segmented coils 31 and the inductive receiver 30, wherein, the power source supplies the supplied power at a power frequency, and the contactless communication system operates in a data transmission frequency range different from the power frequency.

In another embodiment, the contactless communication system comprises an antenna system separate from the segmented coils, for example, employing a wireless LAN antenna 40, as is known to those of skill in the art.

Figure 5:
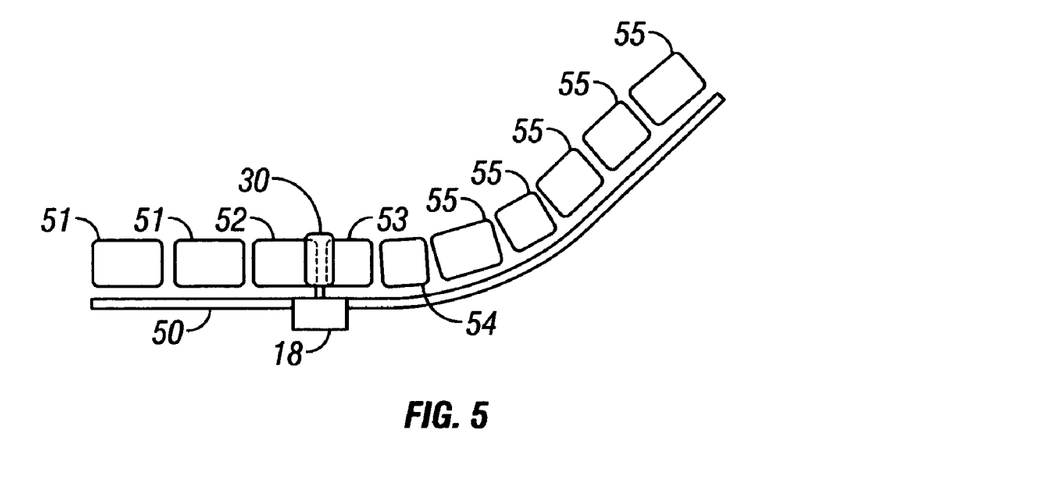
FIG. 5 is a schematic plan view of a picker of FIG. 1 and a track and segmented coils of an alternate embodiment of an automated data storage library.
Figure 6:
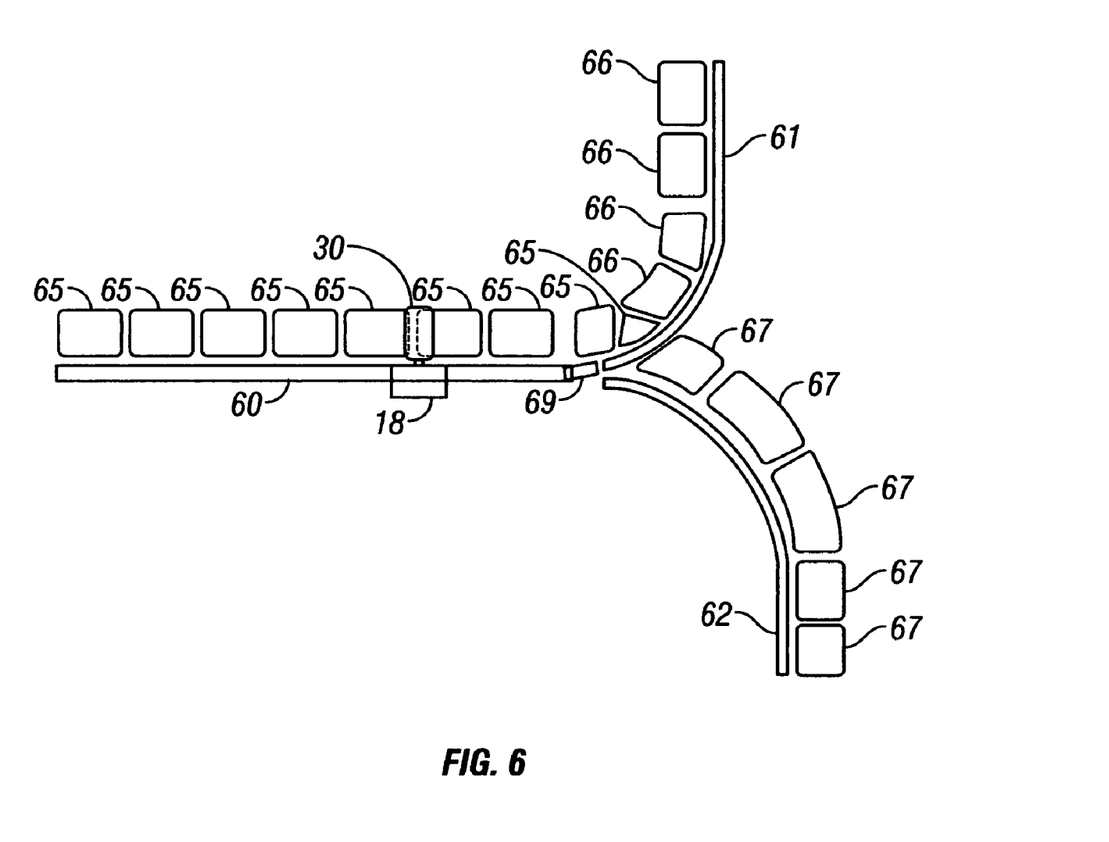
FIG. 6 is a schematic plan view of a picker of FIG. 1 and a track and segmented coils of an alternate embodiment of an automated data storage library.

FIGS. 5 and 6 illustrate examples of layouts of tracks of automated data storage libraries afforded by segmented coils. In FIG. 5, the track 50 is illustrated as curved, and is flanked on one side by the segmented coils 51, 52, 53, 54, 55 arranged in a common plane, such that the induction receiver 30 of the picker carriage 18 is moved parallel to the common plane in close proximity to the segmented coils. As illustrated in the example, each of the plurality of segmented coils 51, 52, 53, 54, 55 is arranged around a central axis, and the central axis is substantially perpendicular to the common plane.

In the embodiment of FIG. 5, the adjacent segmented coils 51, 52, 53, 54, 55 are separated by gaps less than the width of the induction receiver 30 of the picker 18, such that the induction receiver 30 is constantly positioned in proximity to a segmented coil. As discussed above, the power source, in one embodiment energizes all of the coils when the library is in normal operation. In another embodiment, the power source switches the supplied power to selected segmented coils based on an indication of the position of the induction receiver of the picker along the path. In the example, the power source switches the supplied power to segmented coil 52, which is the segmented coil close to the position of the induction receiver of the picker 18 along the path defined by track 50, and to segmented coil 53, which is the segmented coil adjacent to the selected close segmented coil 52. Specifically, the adjacent segmented coil 53 is selected to be at the same side of the selected segmented coil 52 along the path, as the induction receiver 30. If the picker 18 moves away from segmented coil 52 towards segmented coil 54, the power is no longer supplied to segmented coil 52, segmented coil 53 becomes the selected coil, and power is switched to adjacent selected coil 54. Thus, power is always supplied to two (or some other number) of segmented coils to assure that a powered segmented coil is in proximity to the induction receiver 30.

FIG. 6 illustrates a multiple path arrangement of tracks 60, 61 and 62, accommodated by segmented coils 65, 66 and 67, respectively. A track switch 69 may be provided to control the path taken by the picker.

Figure 7:
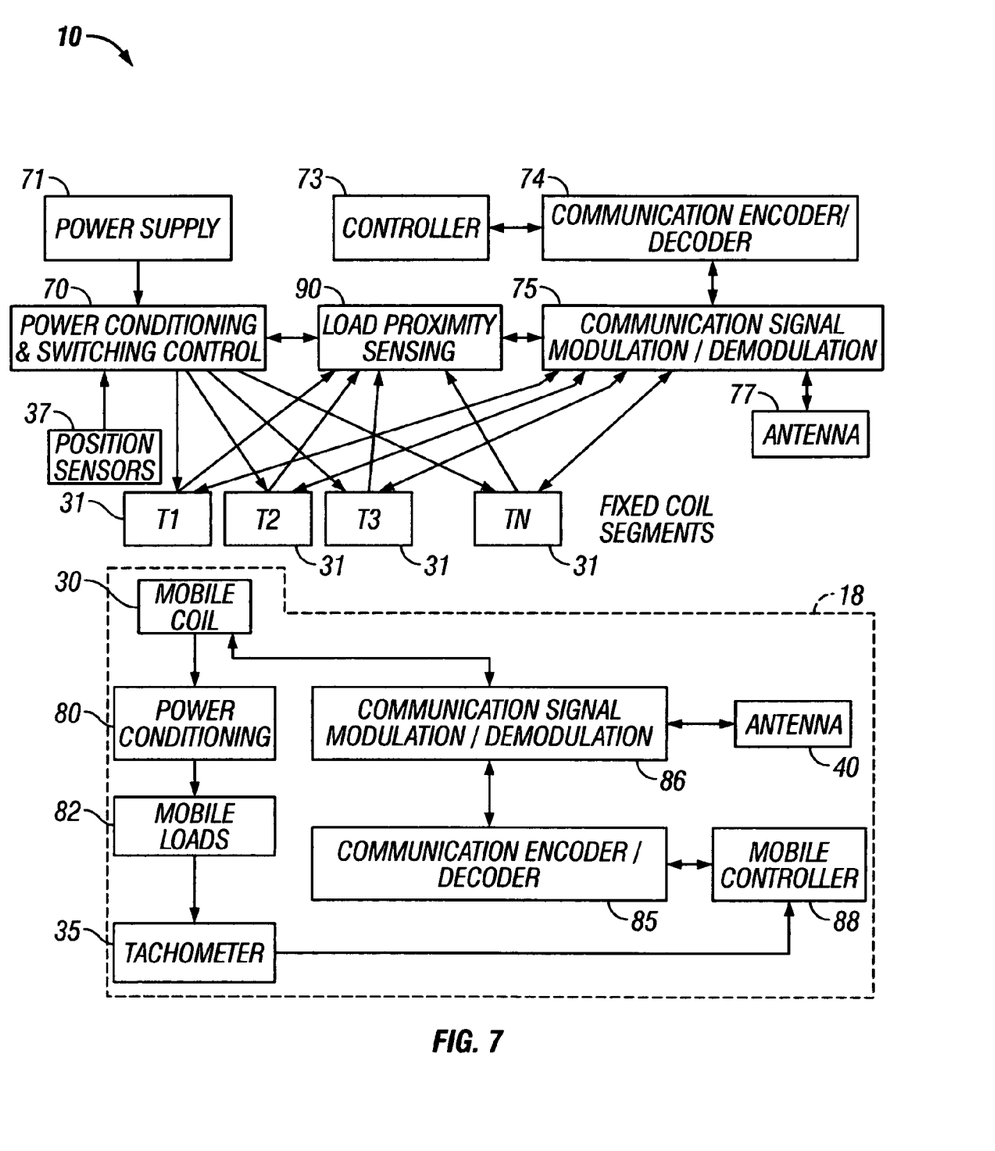
FIG. 7 is a block diagram depicting an embodiment of a contactless power system and contactless communication system in accordance with the present invention.

FIG. 7 illustrates embodiments of a contactless power system and contactless communication system in accordance with the present invention. Segmented coils 31 are switched by a power conditioning and switching control 70 to selectively supply power from a power supply 71 to the segmented coils. A library controller 73 operates the library, and operates the picker 18 by communicating with the picker, via an optional contactless communication system which, in one embodiment, comprises a communication encoder/decoder 74 and a communication signal modulation/demodulation system 75, as is known to those of skill in the art.

In one embodiment, the segmented coils 31 are employed as an antenna system for transmitting and/or receiving signals from the mobile coil 30. In the example, the power source 71 supplies the supplied power at a power frequency, and the contactless communication system operates in a data transmission frequency range different from the power frequency. As an example, the power transfer frequency is in a range of 20KHz-30KHz, and the data transmission frequencies are in the 2MHz-10MHz range for an amplitude modulation scheme, for example implementing a protocol such as CAN (Controller Area Network). The communication signals may be switched between the segmented coils, as the power is switched, or may be constantly working over all of the segmented coils, or a range of segmented coils.

In another embodiment, the contactless communication system comprises an antenna system 77 separate from the segmented coils, transmitting signals to and/or receiving signals from an antenna system 40. An example of an antenna system is a wireless LAN.

Power conditioning circuitry 80 of the picker 18 receives the power from the mobile coil 30 and provides the power in the proper form for the systems 82 of the picker.

The contactless communication system of the picker 18, in one embodiment, comprises a communication encoder/decoder 85 and a communication signal modulation/demodulation system 86, as is known to those of skill in the art. In one embodiment, the mobile coil 30 transmits to and/or receives signals from the segmented coils 31, and in an alternative embodiment, antenna system 40 transmits to and/or receives signals from an antenna system 77. Those signals provide communication for a mobile controller 88. The frequencies are the same as those of the wireless LAN technology chosen.

A tachometer 35 of the picker measures the horizontal motion of the picker, as discussed above, for example, by measuring the rotation of the drive wheel, and supplies the measurement to the mobile controller 88 to determine the positioning of the picker so that the gripper is positioned at the desired column of storage shelves or the desired data storage drive. Thus, the tachometer also provides an indication of the position of the picker along the path defined by the tracks. That information may be supplied by the mobile controller 88 to the library controller 73 over the contactless communication system, and, from that position, the library controller determines the position of the induction receiver 30 of the picker.

In an alternative embodiment, the indication of the position of the induction receiver 30 of the picker may be provided by position sensors 37, as discussed above.

In an alternative embodiment, the inductive load characteristics of a coil changes in accordance with the distance from the inductive receiver, as discussed above, and, this change can be monitored by a load proximity sensor 90 to provide an indication of the position of the induction receiver of the picker.

The indication of the position of the induction receiver of the picker is employed by the power conditioning and switching control 70 to appropriately supply power from the power supply 71 to the appropriate segmented coil(s) 31. Alternatively, the library controller 73 may use the position information to operate switching control 70 to switch power to the appropriate segmented coil(s).

The illustrated components of the automated data storage library 10 and its picker(s) 18 may be varied, combined, or combined functions may be separated, as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A contactless power system for an automated data storage library, said automated data storage library having a plurality of storage shelves for storing data storage cartridges, at least one picker for accessing said data storage cartridges with respect to said storage shelves, and a transport system for guiding said at least one picker along at least one path with respect to said storage shelves, wherein said at least one path comprises two branching paths meeting at a junction with a first path and comprises three sets of tracks, one set of tracks alone each of said two branching paths and along said first path; and additionally comprising a track switch between said two branching paths to control the path taken by said at least one picker, said contactless power system comprising:
  a plurality of segmented coils fixed in a single common plane oriented in parallel to all of said paths and positioned alongside each of said three sets of tracks and said track switch in proximity to at least one induction receiver of said at least one picker, and adjacent said segmented coils are positioned to be separated by gaps less than the width of said induction receiver of said at least one picker, including alongside said three sets of tracks and said track switch; and
  at least one power source supplying power to said segmented coils, for inductive transmission of power by said segmented coils to said at least one induction receiver of said at least one picker;
  wherein said at least one power source additionally switches said supplied power to at least one selected said segmented coil based on an indication of the position of said at least one induction receiver of said picker along said at least one path:
  wherein said at least one power source switches said supplied power to a selected one of said segmented coils close to the position of said at least one induction receiver of said picker along said at least one path, and to at least one of said segmented coils adjacent to said selected close segmented coil; and
  wherein said selected adjacent segmented coil is at the same side of said selected close segmented coil, along said at least one path, as said at least one induction receiver of said at least one picker;
  additionally comprising a contactless communication system for communicating with a communication system of said at least one picker, said contactless communication system comprising an antenna system wherein each of said segmented coils comprises an antenna; wherein said power source supplies said supplied power at a power frequency, and wherein said contactless communication system operates in a data transmission frequency range different from said power frequency.

2. An automated data storage library, comprising;
  a plurality of storage shelves for storing data storage cartridges:
  at least one data storage drive for reading and/or writing data with respect to said data storage cartridges;
  at least one picker for accessing said data storage cartridges with respect to said storage shelves and said at least one data storage drive, said picker having at least one induction receiver;
  a plurality of tracks forming at least one path comprising two branching paths meeting at a junction with a first path, said tracks comprising three sets of tracks, one set of tracks along each of said two branching paths and along said first path; and additionally comprising a track switch between said two branching paths to control the path taken by said at least one picker;
  a transport system for guiding said at least one picker along said at least one path with respect to said storage shelves;
  a plurality of segmented coils fixed in a single common plane oriented in parallel to all of said paths and positioned alongside each of said three sets of tracks and said track switch in proximity to at least one induction receiver of said at least one picker, and adjacent said segmented coils are positioned to be separated by gaps less than the width of said induction receiver of said at least one picker, including alongside said three sets of tracks and said track switch; and
  at least one power source supplying power to said segmented coils, for inductive transmission of power by said segmented coils to said at least one induction receiver of said at least one picker;
  wherein said at least one power source additionally switches said supplied power to selected said segmented coils based on an indication of the position of said at least one induction receiver of said picker along said at least one path;
  wherein said at least one power source switches said supplied power to a selected one of said segmented coils close to the position of said at least one induction receiver of said picker along said at least one path, and to at least one of said segmented coils adjacent to said selected close segmented coil; and
  wherein said selected adjacent segmented coil is at the same side of said selected close segmented coil, along said at least one path, as said at least one induction receiver of said at least one picker;
  additionally comprising a contactless communication system for communicating with a communication system of said at least one picker, said contactless communication system comprising an antenna system wherein each of said segmented coils comprises an antenna; wherein said power source supplies said supplied power at a power frequency, and wherein said contactless communication system operates in a data transmission frequency range different from said power frequency.

* * * * *